(12) United States Patent
Motozawa et al.

(10) Patent No.: US 6,193,296 B1
(45) Date of Patent: Feb. 27, 2001

(54) VEHICLE OCCUPANT PROTECTION SYSTEM

(75) Inventors: Yasuki Motozawa; Koji Sano; Masayoshi Okamoto, all of Wako (JP)

(73) Assignee: Honda Giken Kogyo Kabushiki Kaisha, Tokoyo (JP)

( * ) Notice: Subject to any disclaimer, the term of this patent is extended or adjusted under 35 U.S.C. 154(b) by 0 days.

(21) Appl. No.: 09/376,888

(22) Filed: Aug. 18, 1999

(30) Foreign Application Priority Data

Aug. 20, 1998 (JP) .................................................. 10-233748

(51) Int. Cl.$^7$ ...................................................... B60N 2/02

(52) U.S. Cl. ................ 296/68.1; 297/216.1; 297/216.16; 297/216.18

(58) Field of Search .................................... 296/68.1, 188, 296/189; 297/216.1, 216.16, 216.18

(56) References Cited

U.S. PATENT DOCUMENTS

| | | | |
|---|---|---|---|
| 3,732,944 | * 5/1973 | Kendall | 297/216.1 |
| 3,992,046 | * 11/1976 | Morse | 297/216.1 |
| 4,156,472 | * 5/1979 | Bryll | 297/216.1 |
| 4,832,409 | * 5/1989 | Borlinghaus et al. | 297/216.1 |
| 4,881,781 | * 11/1989 | Borlinghaus et al. | 297/216.1 |
| 5,167,421 | * 12/1992 | Yunzhao | 297/216.1 |
| 5,286,085 | * 2/1994 | Minami | 297/216.16 |
| 5,437,494 | * 8/1995 | Beauvais | 297/216.1 |
| 5,626,203 | * 5/1997 | Habib | 297/216.18 |
| 5,681,057 | * 10/1997 | Whirley et al. | 296/188 |
| 5,685,603 | * 11/1997 | Lane | 297/216.1 |
| 5,746,467 | * 5/1998 | Jesadanont | 296/68.1 |
| 5,810,417 | * 9/1998 | Jesadanont | 296/68.1 |
| 6,003,937 | * 12/1999 | Dutton et al. | 297/216.1 |
| 6,116,561 | * 9/2000 | Christopher | 297/216.1 |

FOREIGN PATENT DOCUMENTS 7-101354    4/1995 (JP).
WO 94/22692  10/1994 (WO).

OTHER PUBLICATIONS

Patent Abstracts of Japan, 07101354, Apr. 18, 1995, http://www2.ipdljpo–miti.go.jp/dbpweb/connector/guest/DB-Pquery/ENGDB/wdispaj.

* cited by examiner

*Primary Examiner*—Joseph D. Pape
*Assistant Examiner*—Kiran Patel
(74) *Attorney, Agent, or Firm*—Skjerven Morrill MacPherson LLP; Alan H. MacPherson

(57) ABSTRACT

The vehicle occupant protection system can significantly reduce the peak deceleration of the vehicle occupant even with a small vehicle body. The system comprises a seat fitted with a seat belt which is supported on a vehicle body so as to be slidable in a direction of an input crash load, a first actuator for applying an acceleration of a same direction as the crash load upon detection of the vehicle crash to the seat, and a second actuator for applying an acceleration of an opposite direction from the crash load with a prescribed time delay following the detection of the vehicle crash to the seat. Thus, in case of a vehicle crash or other high deceleration situations, the seat is accelerated rearward upon the occurrence of a vehicle crash by the first actuator so that the restraining capability of the seat belt is enhanced by applying to the seat a deceleration higher than the vehicle body deceleration during an early phase of the vehicle crash. Thereafter, an acceleration in the opposite direction is applied to the seat by the second actuator so that the forward inertial force acting on the vehicle occupant at the time of the vehicle crash is canceled, and the equalization of the decelerations of the vehicle body, the seat and the vehicle occupant is achieved in an early stage of the crash.

4 Claims, 4 Drawing Sheets

VEHICLE OCCUPANT PROTECTION SYSTEM

TECHNICAL FIELD

The present invention relates to a vehicle occupant protection system, and in particular to a vehicle occupant protection system which can reduce a deceleration acting upon a vehicle occupant at the time of a vehicle crash.

BACKGROUND OF THE INVENTION

In recent years, various proposals have been made in regard to automotive vehicle body structures to maximize the protection of vehicle occupants at the time of a vehicle crash. For instance, proposals have been made to minimize the deceleration of the part of the vehicle body occupied by vehicle occupants by properly selecting the deformation of the remaining part of the vehicle body, and preventing the former part of the vehicle body from deforming (see Japanese patent laid open publication No. 7-101354, for instance).

When a vehicle occupant is restrained to the seat by a seat belt, the forward inertial force acting upon the vehicle occupant at the time of a vehicle crash starts rising only after the vehicle occupant is fully restrained by the seat belt. Because the seat belt inevitably has a certain resiliency, the deceleration acting on the vehicle occupant reaches a maximum level when the vehicle occupant is thrown forward, and the maximum elongation of the seat belt has occurred. The maximum level is higher as the forward movement of the vehicle occupant under the inertial force increases, and is known to substantially exceed the average deceleration of the vehicle body. Therefore, to minimize the impact which the vehicle occupant receives at the time of a vehicle crash, it is necessary to minimize the time delay in the rise in the deceleration of the vehicle occupant with respect to the deceleration of the vehicle body.

However, it is generally impossible to integrally attach a vehicle occupant to a vehicle body, and is therefore difficult to reduce the deceleration of the vehicle occupant in the case of small passenger cars which do not provide adequate deformation strokes of the parts of the vehicle body other than the part occupied by the vehicle occupant only with conventional approaches which essentially consist of attempts to reduce the deceleration of the passenger compartment by controlling the deformation mode of the vehicle body.

BRIEF SUMMARY OF THE INVENTION

In view of such problems of the prior art, a primary object of the present invention is to provide a vehicle occupant protection system which allows the peak deceleration acting upon a vehicle occupant at the time of a vehicle crash to be minimized for a given deformation stroke of the vehicle body.

A second object of the present invention is to provide a vehicle occupant protection system which allows the deceleration acting upon the vehicle occupant at the time of a vehicle crash to be spread over time so as to minimize the peak deceleration acting upon the vehicle occupant.

A third object of the present invention is to provide a vehicle occupant protection system which allows the peak deceleration acting upon the vehicle occupant to be minimized even though the size of the vehicle body is limited.

According to the present invention, these and other objects can be accomplished by providing a vehicle occupant protection system, comprising: a seat which is fitted with a seat belt, and supported on a vehicle body so as to be slidable in a direction of an input crash load resulting from a vehicle crash; a sensor for detecting an occurrence of a vehicle crash; a first actuator for applying an acceleration of a same direction as the crash load upon detection of the vehicle crash to the seat relative to the vehicle body; and a second actuator for applying an acceleration of an opposite direction from the crash load with a prescribed time delay following the detection of the vehicle crash to the seat relative to the vehicle body.

Thus, in case of a vehicle crash or other high deceleration situations, the seat is accelerated rearward upon the occurrence of a vehicle crash by the first actuator so that the restraining capability of the seat belt in restraining the vehicle occupant is enhanced by applying to the seat a deceleration higher than the vehicle body deceleration during an early phase of the vehicle crash. Thereafter, an acceleration in the opposite direction is applied to the seat by the second actuator so that the forward inertial force acting on the vehicle occupant at the time of the vehicle crash is canceled, and the equalization of the decelerations of the vehicle body, the seat and the vehicle occupant is achieved in an early stage of the crash.

The first and second actuators may each comprise a piston and cylinder assembly which is actuated by combustion of a propellant. The second actuator may also consist of a more passive actuator such as a brake or stopper which prevents movement of the seat relative to the vehicle body upon completion of an activation of the first actuator. Such a brake may be incorporated in the piston and cylinder assembly to prevent movement of the seat relative to the vehicle body upon completion of an activation of the piston and cylinder assembly. So as to achieve gradual change in the deceleration level of the vehicle occupant, and minimize the peak deceleration of the vehicle occupant, the stopper may include a buffering member which brings a rearward movement of the seat to a stop relative to the vehicle body with a certain cushioning stroke.

The timings of the activation of the actuators may be determined by suitable calculations and simulations. In general, the activation of the first actuator should occur as soon as possible after the occurrence of a vehicle crash. If desired, a certain prediction arrangement may be made so that the occurrence of a vehicle crash may be predicted before the actual occurrence, and the activation of the first actuator may be initiated with a certain head start. The activation of the second actuator may be timed with a time period required for the seat belt to become effective in restraining a vehicle occupant in the seat following the occurrence of a vehicle crash.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
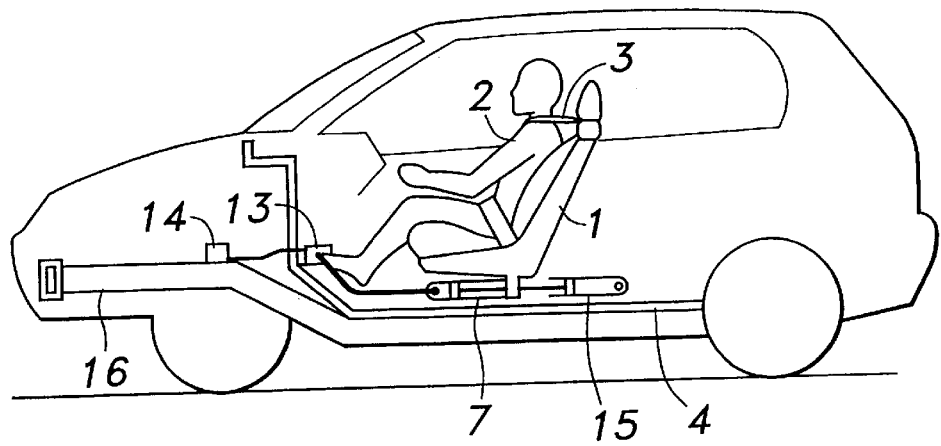
FIG. 1 is a schematic view of a vehicle body embodying the present invention.
Figure 2:
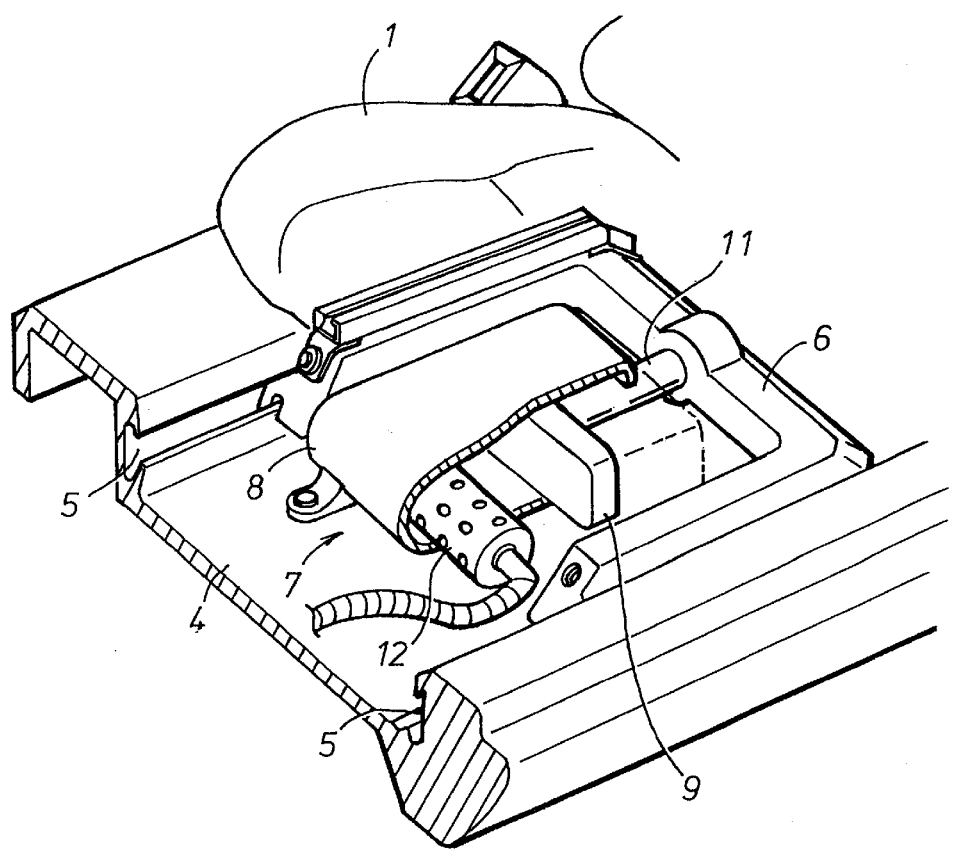
FIG. 2 is a partly broken away perspective view of an essential part of the system of the present invention.

FIG. 1 schematically illustrates a vehicle incorporated with a vehicle occupant protection system embodying the present invention. To restrain movement of a vehicle occupant 2 with respect to a seat 1, the seat 1 is fitted with a seat belt 3. The seat 1 is mounted on a support base 6 slidably engaged by guide rails 5 as illustrated in FIG. 2 so as to be moveable over a certain distance along the fore-and-aft direction of the vehicle with respect to a floor 4 defining a passenger compartment of the vehicle body.

Under the seat 1 is disposed a first actuator 7 for producing a drive force for moving the seat 1, along with the support base 6, rearwardly along the guide rails 5. As also shown in FIG. 2, the first actuator 7 consists of a piston and cylinder assembly which comprises a cylinder 8 fixedly attached to the floor 4, a piston 9 slidably received in the cylinder 8, a piston rod 11 connecting the support base 6 and the piston 9 with each other, and a gas generator 12 serving as energy storing means for producing high pressure gas and applying a drive force to the piston 9. In this embodiment, the cylinder 8 has a laterally elongated cross section, but may also consist of a more conventional cylinder having a circular cross section.

The gas generator 12 is electrically connected to a control unit 13, and can produce high pressure combustion gas by igniting a propellant received therein with electric current from the control unit 13. The control unit 13 supplies ignition current to the gas generator 12 upon detecting a vehicle crash from a signal of a deceleration sensor 14 placed in a suitable part of the vehicle body. Preferably, the deceleration sensor 14 is installed in a relatively forward end of the vehicle body so that an occurrence of a vehicle crash may be detected substantially without any time delay.

The power source in this case consists of a propellant received in the gas generator 12 which produces a high pressure combustion gas upon ignition, but may also consist of other known power sources such as springs of various configurations.

Behind the seat 1 is disposed a second actuator 15 which may have a substantially identical structure as the first actuator 7. The second actuator 15 is designed to produce a drive force for pushing back the support base 6 after it has been moved rearward by the drive force of the first actuator 7, and is normally in an extended state as opposed to the first actuator 7 which is normally in a retracted state. The gas generator of the second actuator 15 is also electrically connected to the control unit 13 so as to be activated with a prescribed time delay following the activation of the first actuator 7.

Figure 3A:
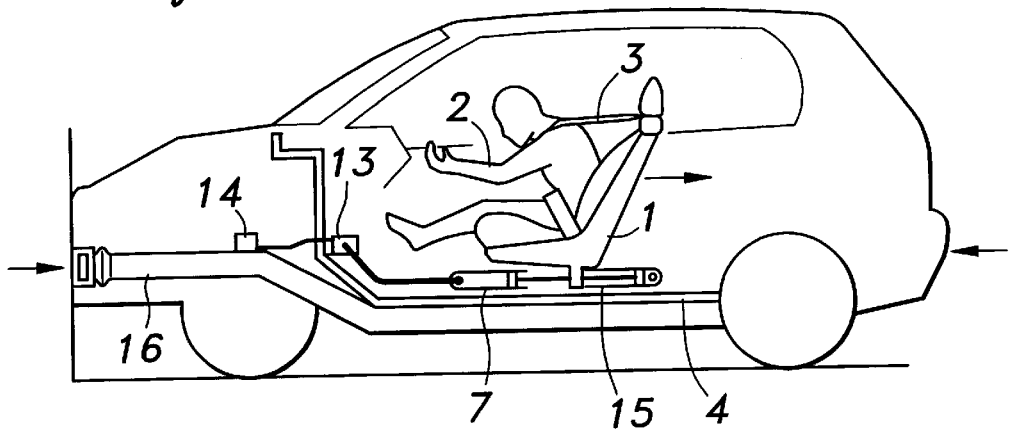
FIGS. 3a to 3c are diagrammatic views showing the process of a vehicle crash.
Figure 3B:
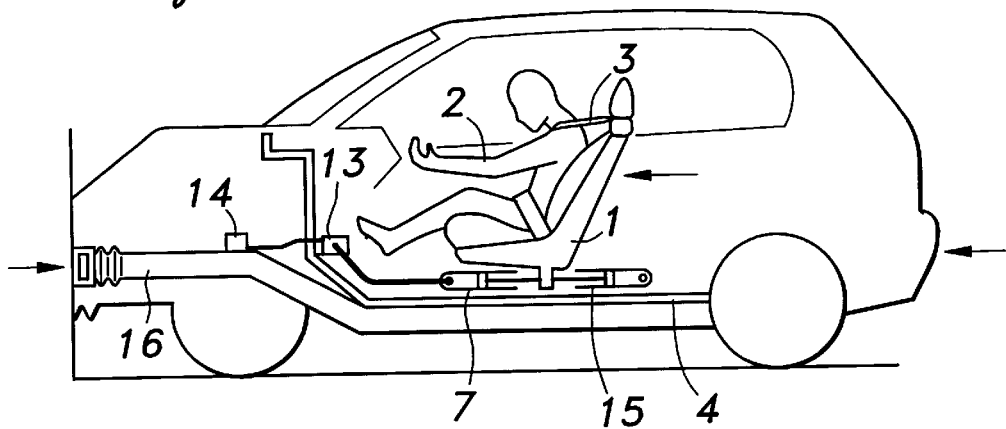
Figure 3C:
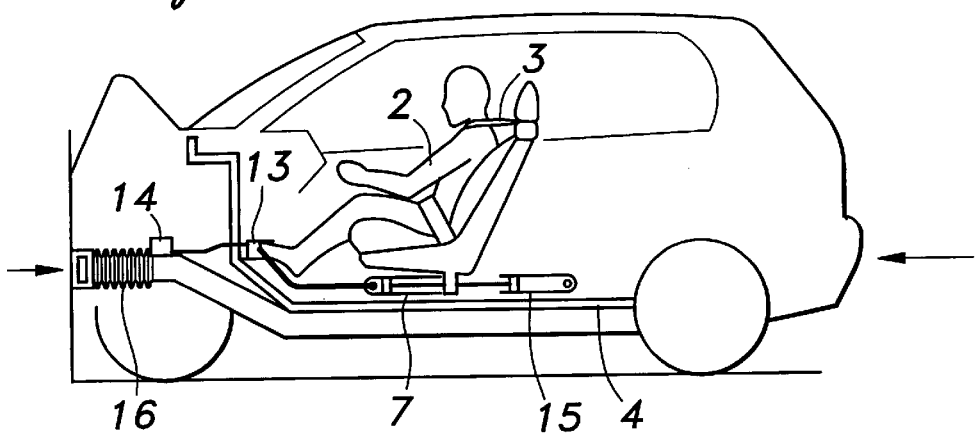
Figure 4:
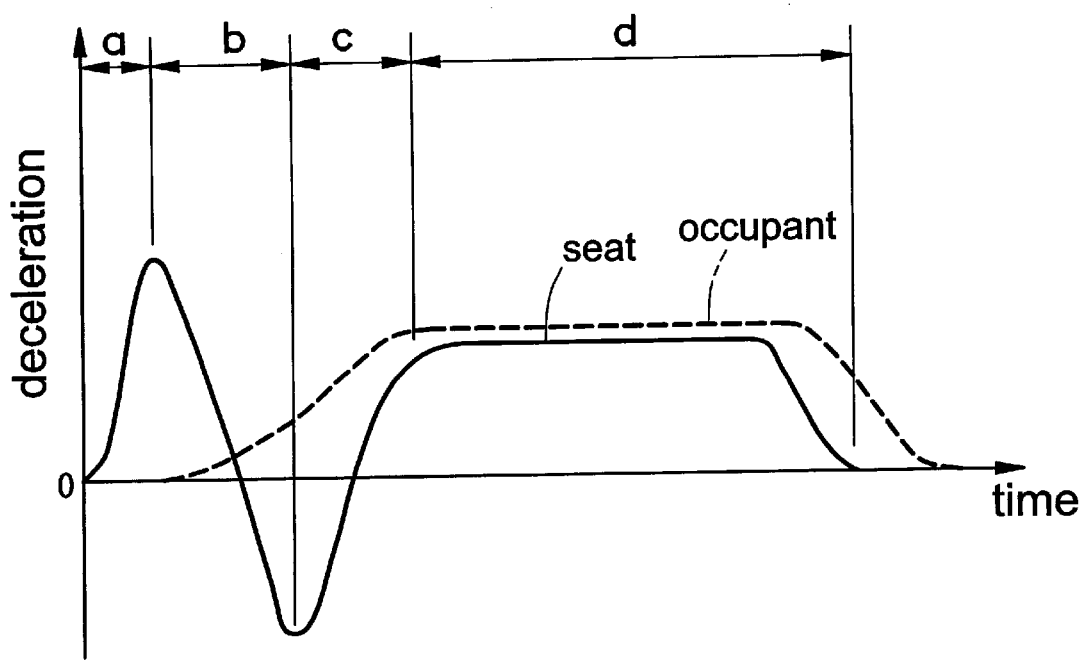
FIG. 4 is a graph showing the time histories of deceleration.

Now the mode of operation of the system of the present invention is described in the following with respect to a case of a frontal crash onto a fixed structure on the road with reference to FIGS. 3 and 4.

Upon the occurrence of a vehicle crash, a side beam 16 which is integral with the floor 4 and extends in the forward direction starts a compressive deformation under an impact load applied to the front end thereof. The side beam 16 is typically provided along each side of the vehicle body although only one of them is shown in the drawings. At this time, the floor 4 continues to move forward by a stroke accommodated by the compression of the side beam 16 while receiving a deceleration due to the deformation stress produced in the side beam 16.

If the control unit 13 judges that the vehicle occupant protection system should be activated according to the signal from the deceleration sensor 14, electric current is supplied to the gas generator 12 to ignite the high pressure gas therein. As a result, the high pressure gas produced from the gas generator 12 is supplied to the bottom end of the cylinder 8.

As the piston 9 is pushed out under the pressure of the gas, the support base 6 connected to the piston 9 via the piston rod 11, hence the seat 1, is subjected to a rearward acceleration or an acceleration in the direction of the crash impact load, and the seat 1 starts moving rearward with respect to the floor 4. Therefore, the seat 1 is subjected to a deceleration which is given as a sum of a first deceleration due to the crash of the vehicle body and a second acceleration due to the rearward force which is applied by the first actuator 7 to the seat 1. The first actuator is attached to the vehicle body while the seat 1 is slidably mounted to the vehicle body. In other words, a deceleration of a higher level than that applied to the floor 4 or the passenger compartment of the vehicle body is applied to the seat 1 (interval a of FIG. 4).

At same time, the pressure of the first actuator 7 causes the piston rod of the second actuator 15 to be retracted. During the above described process, the vehicle occupant 2 is initially moved forward under the inertial force with respect to the vehicle body which is brought to a stop by the crash. But, because the seat 1 is subjected to a rearward acceleration immediately after the crash, the vehicle occupant is instantaneously restrained to the seat 1 by the seat belt 3 which is integral with the seat 1, without producing any relative speed between the vehicle occupant 2 and the floor 4 (FIG. 3a), in spite of a certain resiliency present in the seat belt 3.

After a certain time delay following the supply of electric current to the as generator 12 of the first actuator 7, the propellant of the second actuator 15 is ignited. Thus, the piston rod of the second actuator 15 which has been retracted under the pressure from the first actuator 7 is pushed out, and the seat 1 is accelerated in the forward direction with respect to the floor 4. This in effect reduces the deceleration acting of the seat 1 (interval b of FIG. 4). Thus, the forward inertial force which has been acting on the vehicle occupant during an early phase of the crash is canceled (FIG. 3b). The time delay in the activation of the second actuator 15 following the activation of the first actuator 7 should be determined according to the time required for the seat belt 3 to become effective in restraining the vehicle occupant 2.

During a final phase of the crash, the deceleration of the seat 1 rises sharply upon completion of the operation of the two actuators 7 and 15 (interval c of FIG. 4), and then continues to decelerate with the seat 1 integrally attached to the floor 4 at a deceleration level determined by the deformation stress of the side beam 16. Under this condition, the relative speed between the vehicle occupant 2 and the floor 4 is zero, and because the restraining load of the seat belt 3 balances out with the vehicle body deceleration during the final phase of the crash, the vehicle occupant 2 continues to decelerate, integrally with the floor 4 (FIG. 3c). In other words, under this condition, the vehicle occupant deceleration is equal to the vehicle body deceleration until the vehicle body comes to a complete stop (interval d of FIG. 4).

It is an important factor to minimize the vehicle occupant deceleration in view of reducing the impact which is sustained by the vehicle occupant 2 at the time of a vehicle crash. However, the vehicle occupant deceleration can be reduced from the level of the prior art if the time history of deceleration is effected (as indicated by the solid lines in FIG. 4) in such a manner that a deceleration which is higher than the average vehicle body deceleration is applied to the seat 1 and the seat belt 3 for a short period of time during an early phase of a vehicle crash, and following a short interval of applying a reverse deceleration to the seat 1 and the seat belt 3, a same deceleration as the average vehicle body deceleration is applied to the seat 1 and the seat belt 3. In other words, the initial rapid deceleration of the vehicle occupant (interval a of FIG. 4) contributes to an earlier onset of application of deceleration to the vehicle occupant. In other words, the deceleration which is applied to the vehicle occupant is more spread in time than in the prior art, and the peak deceleration which the vehicle occupant experiences can be minimized. The subsequent activation of the second actuator cancels the effect of the added deceleration on the vehicle occupant. Thus, for a given deformation stroke of the vehicle body, the vehicle occupant deceleration can be reduced from that of a vehicle not equipped with the system of the present invention as indicated by the broken lines in FIG. 4.

To enhance the effect of the present invention which was described above, it is preferable to suitably select the mechanical strength of the side beam 16, the resilient property of the seat belt 3, the output properties and the ignition timings of the two actuators 7 and 15 and the displacement of the seat 1 so as to bring the relative speed between the vehicle occupant 2 and the floor 4 as close to zero as possible, and to balance out the restraining load of the seat belt 3 with the vehicle body deceleration during the final phase of the crash when the relative speed between the seat 1 and the floor 4 is reduced to zero and the deceleration levels of these two parts have been brought equal to each other.

Figure 5:
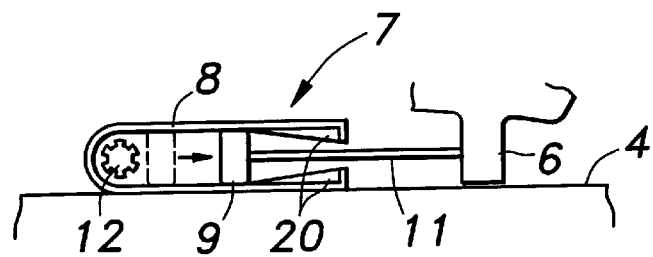
FIG. 5 is a schematic longitudinal sectional view of another embodiment of the present invention.

FIG. 5 shows another embodiment of the present invention. A piston brake 20 is provided on the top end of the cylinder 8 so as to restrict the movement of the piston 9. The piston brake 20 in this case consists of members each having a wedge-shaped cross section installed on the inner circumferential surface of the cylinder 8. This wedge-shaped piston brake 20 produces a reaction load by virtue of a plastic deformation caused by the pressure from the piston 9 as the piston 9 moves from the bottom end to the top end under the pressure from the gas. This reaction load decelerates the piston 9, and hence the seat 1. This in effect accelerates the seat 1 in the forward direction with respect to the floor 4 (interval b in FIG. 4). Thus, the piston brake 20 performs the same function as the second actuator 15 of the first embodiment.

Figure 6A:
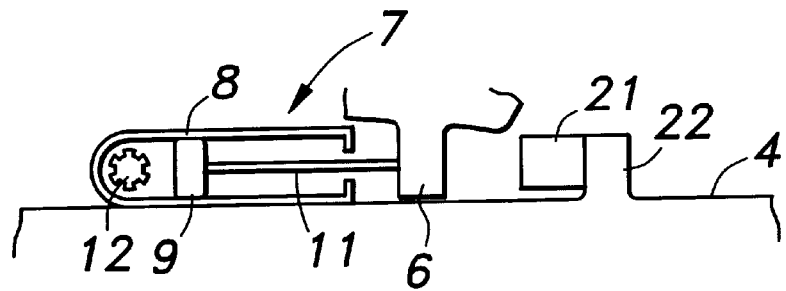
FIGS. 6a to 6c are schematic longitudinal sectional views of yet another embodiment of the present invention.
Figure 6B:
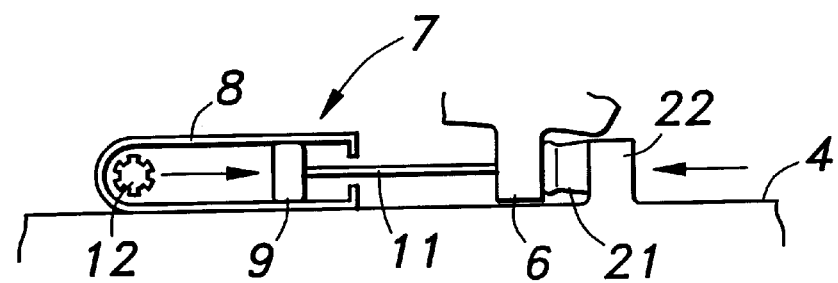
Figure 6C:
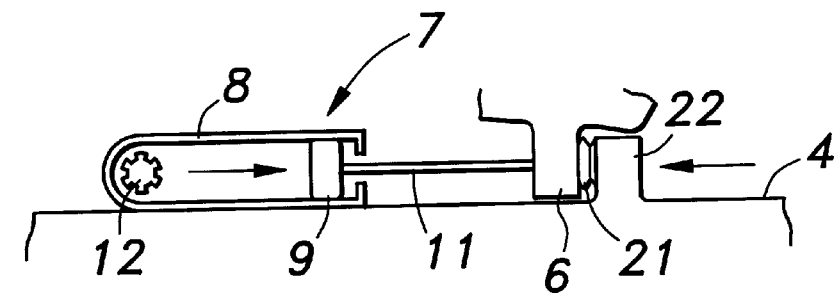

FIG. 6 shows yet another embodiment of the present invention. In this case, instead of using the piston brake 20 installed in the cylinder 8, a stopper 21 is provided on the floor 4 for restricting the rearward movement of the seat 1. This stopper 21 comprises a plastic member which is adapted to compressively deform toward a rigid projection formed integrally with the floor 4. Thus, as piston 9 on the bottom end under the pressure of the gas, the stopper 21 undergoes a plastic deformation under the pressure from the seat supporting base 6, and produces a reaction load. This reaction load decelerates the piston 9 in a similar fashion as the above described embodiments. Thus, the stopper 21 performs the same function as the second actuator 15 of the first embodiment.

Thus, according to the present invention, because the seat fitted with a seat belt is accelerated by the first actuator in the direction of the application of the impact load during an early phase of a vehicle crash so as to produce a deceleration higher than the vehicle body deceleration, and a reverse acceleration is then produced in the seat and the seat belt by the second actuator so as to cancel the inertial force of the vehicle occupant who is thrown forward and equalize the decelerations of the vehicle body, the seat and the vehicle occupant, it has been made possible to produce a desired time history of deceleration in the seat and the seat belt so as to reduce the peak of the vehicle occupant deceleration for a given deformation stroke as compared to the prior art. Furthermore, because the displacement of the vehicle occupant inside the passenger compartment can be minimized, the risk of the vehicle occupant sustaining an injury from a secondary impact upon a fixed structure of the passenger compartment can be reduced.

Although the present invention has been described in terms of preferred embodiments thereof, it is obvious to a person skilled in the art that various alterations and modifications are possible without departing from the scope of the present invention which is set forth in the appended claims.

What is claimed is:

1. A vehicle occupant protection system, comprising:
   a seat which is fitted with a seat belt, and supported on a vehicle body so as to be slidable in a direction of an input crash load resulting from the vehicle crash;
   a sensor for detecting an occurrence of a vehicle crash;
   a first actuator for applying an acceleration of a same direction as said crash load upon detection of said vehicle crash to said seat relative to said vehicle body; and
   a second actuator for applying an acceleration of an opposite direction from said crash load with a prescribed time delay following the detection of said vehicle crash to said seat relative to said vehicle body.

2. A vehicle occupant protection system according to claim 1, wherein said first actuator comprises a piston and cylinder assembly which is actuated by combustion of a propellant.

3. A vehicle occupant protection system according to claim 1, wherein said second actuator comprises a piston and cylinder assembly which is actuated by combustion of a propellant.

4. A vehicle occupant protection system according to claim 1, wherein said time delay corresponds to a time period required for the seat belt to become effective in restraining a vehicle occupant in said seat following the occurrence of the vehicle crash.

* * * * *